United States Patent [19]

Drexler

[11] Patent Number: 4,896,027
[45] Date of Patent: Jan. 23, 1990

[54] PORTABLE DETACHABLE DATA RECORD

[75] Inventor: Jerome Drexler, Los Altos Hills, Calif.

[73] Assignee: Drexler Technology Corporation, Mountain View, Calif.

[21] Appl. No.: 311,442

[22] Filed: Feb. 14, 1989

Related U.S. Application Data

[63] Continuation of Ser. No. 31,715, Mar. 27, 1987, abandoned, which is a continuation-in-part of Ser. No. 692,788, Jan. 17, 1985, Pat. No. 4,665,004.

[51] Int. Cl.$^4$ ............................................. G06K 5/00
[52] U.S. Cl. .................................. 235/488; 235/487; 40/159; 40/626; 206/461; 283/900
[58] Field of Search ................ 40/152, 159, 625, 626; 283/900; 206/461; 235/487, 488, 492, 493

[56] References Cited

U.S. PATENT DOCUMENTS

| | | | |
|---|---|---|---|
| 3,921,318 | 11/1975 | Calavetta | 283/900 |
| 3,943,645 | 3/1976 | Viesturs | 40/10 D |
| 3,958,690 | 5/1976 | Gee, Sr. | 283/900 |
| 3,999,700 | 12/1976 | Chalmer | 229/68 R |
| 4,031,640 | 6/1977 | Hanna, Jr. et al. | 283/900 |
| 4,236,332 | 12/1980 | Domo | 40/2.2 |
| 4,619,469 | 10/1986 | Grover | 283/900 |
| 4,620,727 | 11/1986 | Stockburger et al. | 283/72 |
| 4,632,428 | 12/1986 | Brown | 283/900 |
| 4,692,394 | 9/1987 | Drexler | 283/900 |

Primary Examiner—A. D. Pellinen
Assistant Examiner—Jeffrey A. Gaffin
Attorney, Agent, or Firm—Thomas Schneck

[57] ABSTRACT

A compact auxiliary data record storing at least one quarter megabyte of data in card size and detachably adherable to a support surface. The support surface may be an eye-readable primary record, such as a sheet of X-ray film or a book. The data card may be an optical card, a semiconductor memory card or a magnetic memory card.

24 Claims, 2 Drawing Sheets

PORTABLE DETACHABLE DATA RECORD

CROSS REFERENCE TO RELATED APPLICATION

This is a continuation of co-pending application Ser. No. 07/031,715 filed on Mar. 27, 1987, now abandoned.

This is a continuation-in-part of application Ser. No. 692,788, filed Jan. 17, 1985, now U.S. Pat. No. 4,665,044, granted May 12, 1987.

DESCRIPTION

1. Technical Field

The invention relates to high density information storage, and in particular to a machine readable data record for use with another record medium.

2. Background Art

In U.S. Pat. No. 4,236,332, Domo discloses a wallet-size medical record card to be carried by the individual containing a microfilm portion having some data visible to the eye and other data visible by magnification. The directly visible data is code characters pertaining to emergency medical conditions of the patient and magnifiable data protions detail the medical history.

In medical records archival data storage, it is frequently necessary to store pictures such as digital X-ray pictures, CAT-scan pictures, digital microscope photographs, NMR and ultrasonic scan pictures, and other diagnostic images. These pictures originate as digital data. If digital data is not recorded in anticipation of future image processing, it would be lost forever. Frequently the data is converted to an enhanced eye readable picture representing only one form of the data.

In prior application Ser. No. 692,788, J. Drexler teaches a method for recording medical data in which both an eye readable medical picture and a digital representation of the same picture are recorded and stored together in side-by-side relationship. A photographic medium is exposed and developed to create an eye-readable medical picture, and a high data capacity optical data storage lamella is disposed on the medium next to the picture. Alternatively, the lamella may first be disposed on the photographic medium, then the medium exposed and developed. In either case, a digital representation of the medical picture is then laser recorded onto the lamella by creating spots of contrasting reflectivity. Each data spot (which represents a binary 0 to 1) is very small in diameter (approximately 5 microns) and tightly spaced between adjacent spots (a distance of 5–20 microns). Because smaller spots and tighter spacing results in more binary numbers being recorded, considerable storage capacity is achieved. A significant amount of additional medical information related to the picture, such as an analysis or diagnosis, can also be recorded on the lamella with the digital representation of the medical picture. An advantage of that invention is that the digital representation of the medical picture can be transmitted over communication links, enhanced by computers or stored in a manner more permanent than film.

In connection with medical X-rays, there are often two needs. One need is to have a digitized version of a picture or scan. Another need is to have annotations, such as a radiologist's report, accompanying the pictures. Hospitals and insurance companies are presently faced with burgeoning amounts of diagnostic data, both pictorial and written. Yet, the means for organizing, recording and storing data remains rudimentary.

An object of the invention was to devise a data record for accompanying an existing record as an auxiliary data record, to facilitate organizing, transmitting and storing such existing records.

SUMMARY OF INVENTION

The above object has been met with an auxiliary data record which is a data card capable of storing at least one quarter of a megabyte of machine readable data, preferably more, for either annotating another data record, or duplicating it in digital form. By this means, information in the primary record may be easily electonically transmitted, copied, or stored in miniature form. The auxiliary data record is a data card of a type having opposed sides, with the back side having a detachable adhesion region for attachment to and detachment from a primary data record. Alternatively, the card may be housed in an envelope having a similar adhesion region. The auxiliary record or envelope may be used directly with primary information records and carriers such as medical X-rays or envelopes holding medical X-rays, books, or the like.

By uniting the auxiliary data record with the primary data record, machine readable data which is linked to the primary record may be copied, electronically transmitted or stored in a very compact format.

BEST MODE FOR CARRYING OUT THE INVENTION

Figure 1:
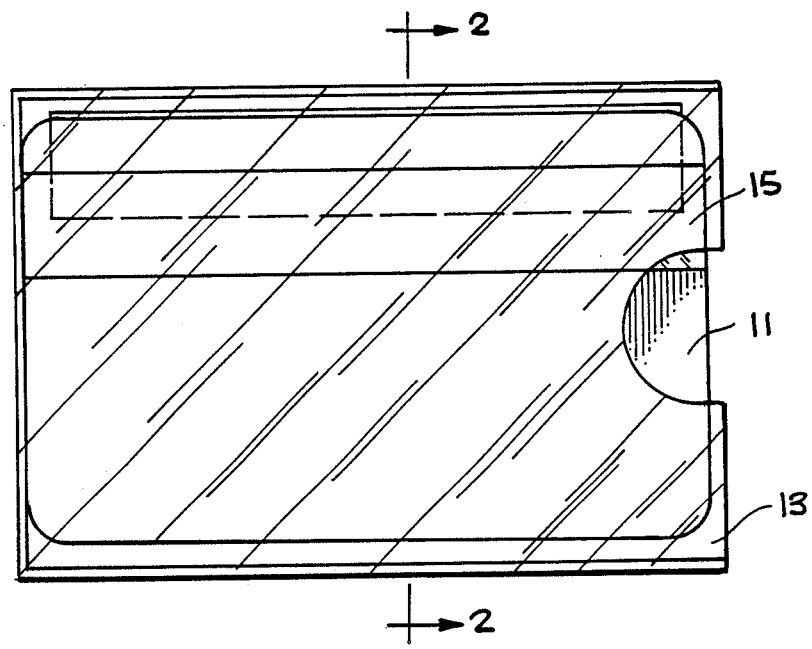
FIG. 1 is a front view of an auxiliary data record of the present invention in a protective envelope.

With reference to FIG. 1, a data card 11 is shown in transparent protective envelope 13. The card may be an optical or magnetic data card or a semiconductor memory card.

An illustrative magnetic card is shown in U.S. Pat. No. 3,838,252 to Hynes et al. An illustrative semiconductor memory card is shown in U.S. Pat. No. 3,971,916 to R. Moreno. Although the exemplary described by Moreno has only sixteen kilobytes of memory, subsequently developed memory cards have a memory capability exceeding one quarter megabyte. An illustrative optical data card is shown in U.S. Pat. No. 4,544,835 to J. Drexler. Other magnetic, semiconductor or optical data cards may also be employed.

Moreover, the card may employ two technologies. For example, a semiconductor memory card may have a stripe of optical and/or magnetic recording material thereon. This combination of media allows the same or different information to be recorded in two forms. This facilitates reading of the information in those situations where an office might have one type of reader, but not another. Presently, since there are no universal standards for readers, or for card formats, a single card may have to combine two technologies or a single envelope might have to hold a plurality of cards for different types of readers.

Stripe 15 on card 11 is a strip of magnetic or optical recording material. If card 11 is a semiconductor memory card, commonly known as a chip card, the semiconductor elements are buried within the card and are not visible at the surface. The front surface of the card may have additional data, such as a photograph, or information related to a particular user which is eye-readable.

The strip of recording material, or the semiconductor memory elements, may be read-only material or elements. Alternatively, the strip may be a direct-read-after-write or erasable medium. For most applications, it is preferable to have an updatable medium so that any information which is added to a primary information record, such as an additional medical X-ray, may be annotated by use of the auxiliary data record of the present invention.

A typical size for the card, but not a critical size, is approximately 54 millimeters in width and approximately 85 millimeters in length. The preferred maximum width is less than 65 millimeters and the preferred maximum length is less than 95 millimeters. Any strip of recording material on the card has a typical width of about 15 millimeters and a thickness of about 100-500 microns, thereby leaving room for other indicia. Recording material is applied to the front surface of the card. The front and back surfaces of the card should be substantially planar and parallel. A thin transparent laminating material may be applied over the front surface of the card. The card base is typically a dielectric, such as polyvinyl chloride or polycarbonate.

Figure 2:
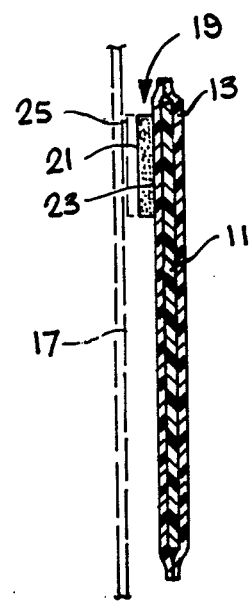
FIG. 2 is a side sectional view of the data record of FIG. 1.

With reference to FIG. 2, the envelope 13 carrying the auxiliary card 11 is adhered to a primary data record 17 by means of an adhesion member 19. The adhesion member may be a VELCRO strip having fasteners 21 on one side and an adhesive, such as hot-melt material, joining the opposite surface 23 to the rear surface of envelope 13. VELCRO is a registered trademark for synthetic materials which adhere when pressed together and which are detachable when pulled apart. Fasteners 21 are linked to a similar VELCRO strip 25 which is joined to the primary data record by hot-melt material. The two VELCRO strips allow joining of card envelope 13 to the primary record 17.

Figure 3:
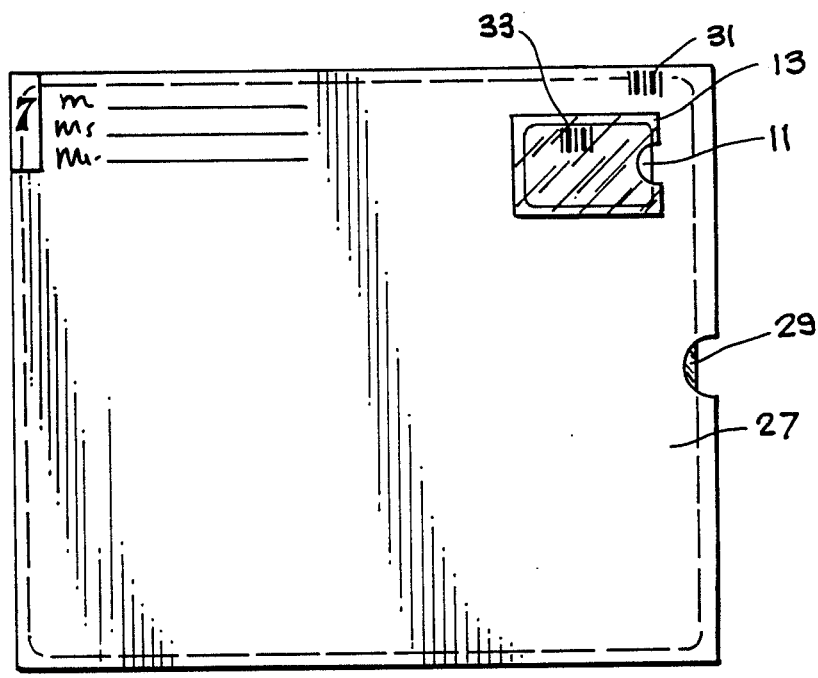
FIG. 3 is a front view of a primary record carrier with the auxiliary data record of FIG. 1 adhered thereto.

With reference to FIG. 3, an envelope 13 holding an auxiliary data card 11 is seen to be adhered to a large envelope 27 of the type which may hold sheets of film, such as X-ray 29. Card envelope 13 may be adhered to primary data envelope 27 by either of the methods described above, namely VELCRO strips or hot-melt material. In organizing large numbers of primary data records and accompanying envelopes, it may be useful to link, with similar identification, the auxiliary data cards and their small envelopes with the larger envelopes of the primary record. One means of accomplishing this is by bar code indicia 31 applied to primary record envelope 27 and similar indicia 33 applied to data card envelope 13. If the data card envelope 13 becomes separated or lost relative to the primary record envelope 27, bar code would be of assistance in rapidly identifying the proper location of the record. Eye-readable indicia could also be used.

Figure 4:
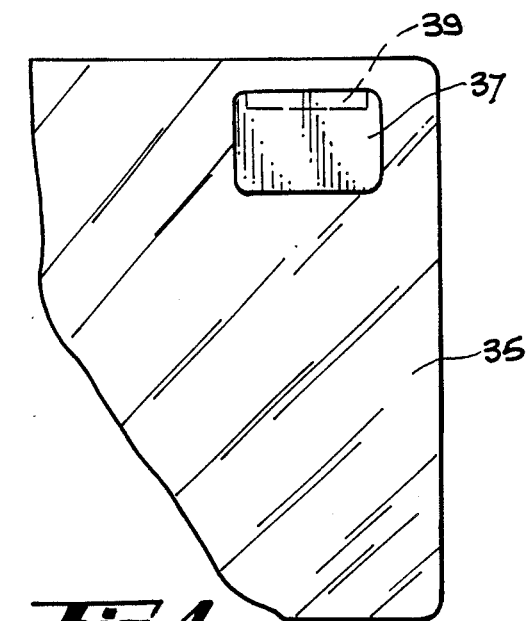
FIG. 4 is a front view of a data record of the present invention adhered to a film sheet.

With reference to FIG. 4, a film sheet 35 is shown having an auxiliary data card 37 mounted directly thereto. This figure illustrates that a data card may be removably joined by means of an adhesion member 39 directly to the sheet. U.S. Pat. No. Re 32,249 to Esmay shows a double-coated pressure-sensitive adhesive tape. Adhesives for tape are known which can be peeled away without leaving any adhesive residue. For example, see U.S. Pat. No. 4,599,265 to Esmay.

Figure 5:
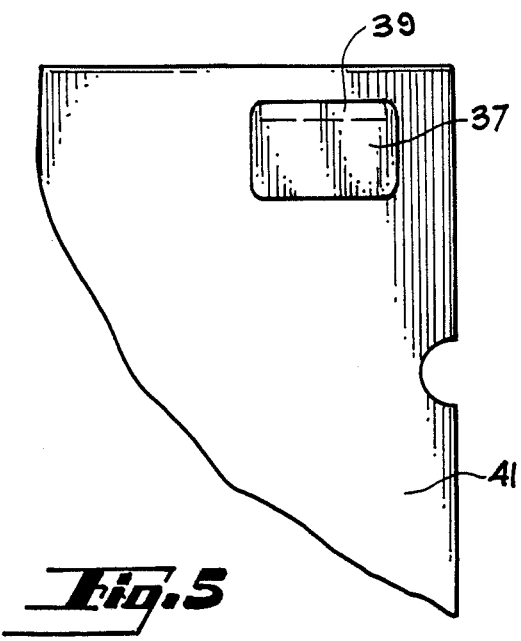
FIG. 5 is a data record of the present invention adhered to a support surface.

FIG. 5 shows a similar situation wherein card 37 and adhesion member 39 are adhered directly to support surface 41 which may merely be a convenient holder for card 37, such as a temporary storage facility. The purpose of FIG. 5 is to illustrate that the data card, with or without its protective envelope, may be joined to any support surface and serve a useful purpose, such as awaiting the arrival of a primary data record.

Figure 6:
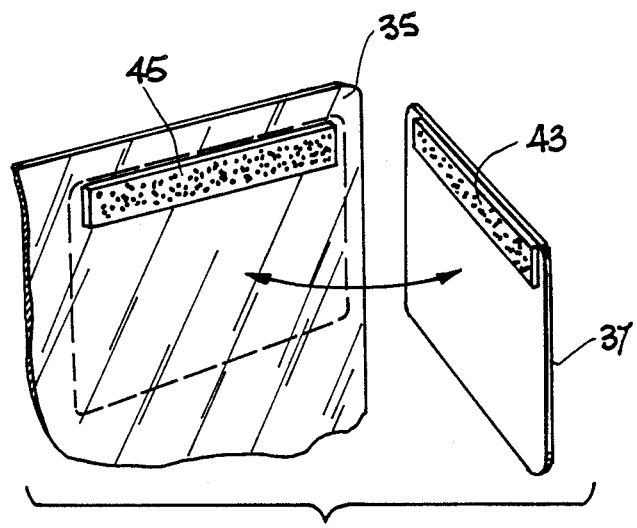
FIG. 6 is a perspective view of a data record of the present invention showing a means for adhering the data record to a primary record.

FIG. 6 shows a detail for an alternative joinder structure for a card. In this situation, a first adhesive strip 43 is applied to the backside of card 37. A similar strip 45 is applied to film sheet 35. Strips 43 and 45 retain sufficient tack to facilitate repeated joinder of the card to the film sheet even if strip 43 does not land directly on top of strip 45, or lands partially on top of it. In handling data records, frequently there is little attention given to handling of the records and it is desirable to have card 37 rapidly joined to sheet 35 even if it is joined relatively high or low compared to the desired position.

Figure 7:
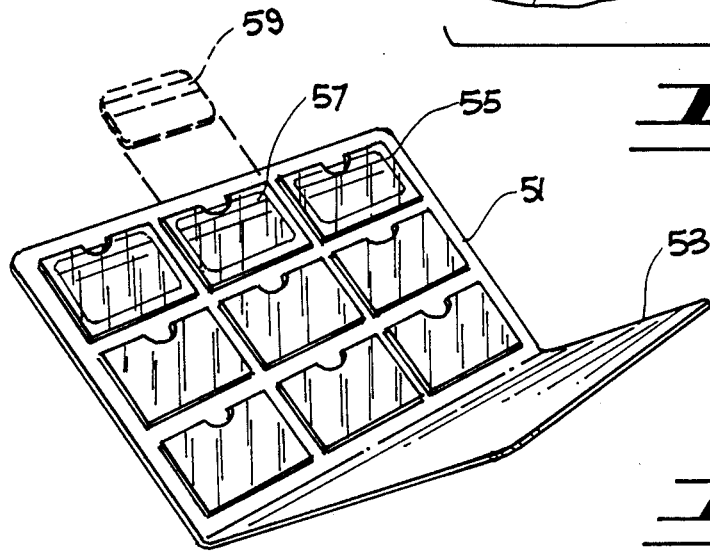
FIG. 7 is a perspective view of a book cover showing a plurality of data records of the present invention in protective envelopes adhered to an inside surface of one of the covers.

With respect to FIG. 7, book covers 51 and 53 are shown in an open position, with book pages removed. A plurality of auxiliary data card envelopes 55, 57, and so on, are shown joined to cover 51 for detachably adhering the card to the cover. The envelopes have open ends so that cards may be readily removed. Normally, an envelope is removed first from cover 51 and then a card, such as card 59 is then removed from the envelope. The material of the envelopes is selected to have sufficient friction against the card to retain it in place. Alternatively, a flap can be provided on the envelopes to assist in preserving cards in place, although this may add undesired thickness to the envelopes. The cover 51 serves as a carrier for a plurality of cards such that a number of cards may be stored in a central facility as copies of primary data records, such as medical X-rays. The covers serve to provide a location for eye-readable information, such as indexing of the cards as well as providing an environmental housing, functioning as a secondary protective enclosure, the card envelope being the primary protective enclosure. The present invention allows a card to be removed, together with its primary protective enclosure, if one is provided, so that information stored on the card may be copied, electronically transmitted or read, without disturbing other cards.

Alternatively, the support surface for the auxiliary data record may be a piece of equipment, such as a piece of electronic or communications equipment, or may be the interior of an automotive glove compartment. In either case, the auxiliary data record is stored in a position where it may be used with another piece of equipment.

I claim:

1. A data record for accompanying another record, each of said records being unassociated with regard to operable use of the other, but associated by information content, comprising, a data card having opposed front and back planar surfaces, the card capable of storing at least one quarter megabyte of machine readable data, said card being a first data record, and detachable adhesion means mounted on the back surface of the card for repeatable attachment and detachment of said card to and from a support surface associated with a second record, said card being machine readable when detached from said support surface.

2. The data record of claim 1 wherein said detachment adhesion means is a first VELCRO strip having an adhesion side and an opposite fastener side made of synthetic materials which adhere when pressed together, the adhesive side joined to the back surface of the card.

3. The data record of claim 2 further comprising a second VELCRO strip made of synthetic materials which adhere when pressed together and which strip is adhered to the support surface, said second VELCRO strip detachably adhering to said first VELCRO strip when pressed together.

4. The data record of claim 1 wherein said detachable adhesion means is a first double sided adhesive strip joined to the back surface of the card.

5. The data record of claim 4 further comprising a second double sided adhesive strip adhered to the support surface, said second double sided adhesive strip detachably adhering to said first double sided adhesive strip when pressed together.

6. The data record of claim 1 wherein said support surface is X-ray film.

7. The data record of claim 1 wherein said support surface is an envelope for sheet X-ray film.

8. The data record of claim 1 wherein said data card has maximum dimensions of 65 millimeters by 95 millimeters.

9. A data record for accompanying another record comprising, a data card having opposed front and back planar surfaces, the card capable of storing at least one quarter megabyte of machine readable data, said card being a first data record, a protective envelope having opposed front and back planar surfaces, the protective envelope housing said card, detachable adhesion means mounted on the back surface of the envelope for repeatable attachment and detachment of the envelope to and from a support surface, said support surface associated with a second record.

10. The data record of claim 9 wherein said detachable adhesion means is a first VELCRO strip having an adhesive side and an opposite fastener side made of synthetic materials which adhere when pressed together, the adhesive side joined to the back surface of the envelope.

11. The data record of claim 10 further comprising a second VELCRO strip made of synthetic materials which adhere when pressed together and which strip is adhered to the support surface, said second VELCRO strip detachably adhering to said first VELCRO strip when pressed together.

12. The data record of claim 9 wherein said detachable adhesion means is a first double sided adhesive strip joined to the back surface of the envelope.

13. The data record of claim 12 further comprising a second double sided adhesive strip adhered to the support surface, said second double sided adhesive strip detachably adhering to said first double sided adhesive strip when pressed together.

14. The data record of claim 9 wherein said support surface is X-ray film.

15. The data record of claim 9 wherein said support surface is an envelope for sheet X-ray film.

16. The data record of claim 9 wherein said protective envelope is transparent.

17. The data record of claim 9 wherein said protective envelope is opaque.

18. The data record of claim 9 wherein said protective envelope and said support surface both carry bar code indicia means for relating one to the other.

19. The data record of claim 9 wherein a plurality of detachable envelopes, each containing a data card, are mounted on a single support surface.

20. The data record of claim 9 wherein said support surface is a book cover.

21. A data record for accompanying another record comprising, a substrate having opposed front and back planar surfaces, memory means fixed to said substrate for storing at least one quarter megabyte of machine readable data, said substrate and memory means forming a data card having a first data record, and detachable adhesion means mounted on the back surface of said substrate for repeatable attachment and detachment of said data card to and from a support surface associated with a second data record, each of said first and second data records being operatively unassociated with respect to the other, with said data card being machine readable when detached from said support surface.

22. The data record of claim 21 wherein data card is an optical data card.

23. The data record of claim 21 wherein said data card is a semiconductor memory card.

24. The data record of claim 21 wherein said data card is a magnetic memory card.

* * * * *